(12) United States Patent
Xu et al.

(10) Patent No.: US 8,452,097 B2
(45) Date of Patent: May 28, 2013

(54) APPARATUS AND METHOD FOR EXTRACTING CIRCUMSCRIBED RECTANGLES OF CHARACTERS IN TRANSPLANTABLE ELECTRONIC DOCUMENT

(75) Inventors: Wenhui Xu, Beijing (CN); Cheng Du, Beijing (CN); Fumihiro Hasegawa, Tokyo (JP); Koichi Inoue, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 206 days.

(21) Appl. No.: 12/952,265

(22) Filed: Nov. 23, 2010

(65) Prior Publication Data

US 2011/0129157 A1 Jun. 2, 2011

(30) Foreign Application Priority Data

Nov. 27, 2009 (CN) .......................... 2009 1 0249849

(51) Int. Cl.
*G06K 9/18* (2006.01)
(52) U.S. Cl.
USPC .......................................................... 382/182
(58) Field of Classification Search
USPC .......................................................... 382/182
See application file for complete search history.

(56) References Cited

U.S. PATENT DOCUMENTS

| | | | |
|---|---|---|---|
| 5,859,648 A | 1/1999 | Moore et al. | |
| 6,801,673 B2 | 10/2004 | Chao et al. | |
| 6,853,980 B1 * | 2/2005 | Ying et al. | 705/26.62 |
| 7,472,348 B2 * | 12/2008 | Tanioka | 715/269 |
| 2001/0019329 A1 * | 9/2001 | Kobayashi | 345/467 |
| 2002/0046261 A1 * | 4/2002 | Iwata et al. | 709/219 |
| 2003/0068099 A1 | 4/2003 | Chao et al. | |
| 2007/0171446 A1 * | 7/2007 | Yamamoto et al. | 358/1.11 |
| 2009/0116744 A1 * | 5/2009 | Woo et al. | 382/187 |
| 2009/0123071 A1 * | 5/2009 | Iwasaki | 382/176 |

OTHER PUBLICATIONS

May 31, 2011 European search report in connection with counterpart European patent application No. 10 19 2425.
Chao, Hui, et al., "PDF Document Layout Study with Page Elements and Bounding Boxes," http://www.science.uva.nl/events/dlia2001/progam/s12_DL03.pdf, retrieved on Jul. 29, 2003.
Baker, Josef B., et al. (2008) "Extracting Precise Data on the Mathmetical Content of PDF Documents," Towards Digital Mathematics Library, pp. 75-79, http://www.fi.muni.cz/usr/sojka/download/dml2008/14.pdf, retrieved on May 17, 2011.

* cited by examiner

*Primary Examiner* — Samir Ahmed
*Assistant Examiner* — Totam Le
(74) *Attorney, Agent, or Firm* — Cooper & Dunham LLP

(57) ABSTRACT

Disclosed are an apparatus and a method for extracting circumscribed rectangles of one or more characters in a transplantable electronic document. The apparatus comprises a command and resource extraction device for extracting text-segment-related commands and original font resources; a division device for dividing the original font resources into fonts; a font replacement device for seeking fonts, and obtaining font resources after font replacement; a measurement information extraction device for extracting character shape measurement information of the characters; and a calculation device for calculating the circumscribed rectangles of the characters.

7 Claims, 3 Drawing Sheets

APPARATUS AND METHOD FOR EXTRACTING CIRCUMSCRIBED RECTANGLES OF CHARACTERS IN TRANSPLANTABLE ELECTRONIC DOCUMENT

BACKGROUND OF THE INVENTION

1. Field of the Invention

The present invention relates to an apparatus and a method for extracting circumscribed rectangles of one or more characters in a transplantable electronic document, and more particularly relates to an apparatus and a method for extracting circumscribed rectangles of one or more characters in a transplantable electronic document in a case where one or more fonts need to be replaced.

2. Description of the Related Art

Transplantable electronic documents such as PDF (Portable Document Format) files, PS (PostScript) files, etc., are being widely used in everyday office work. However, it is still difficult to extract specified information in the transplantable electronic documents. For example, Adobe™ Acrobat™ Reader can extract circumscribed rectangles of characters in a PDF file, but the extraction results sometimes are not good enough to make a user feel satisfied. The reason is that if a kind of font in the PDF file cannot be utilized (i.e. lacking character shape measurement information), it is impossible to extract circumscribed rectangles of characters having this font.

Conventional font replacement methods are mainly focused on grids of characters, so visually similar fonts need to be found. However, these kinds of methods are not suitable for extracting circumscribed rectangles of characters. The reason is that extraction of circumscribed rectangles of characters needs to find similar fonts based on the aspect of character shape measurement, not based on the aspect of sense of vision.

U.S. Pat. No. 6,801,673 B2 discloses a method for extracting words in a PDF file. In this patent, words are extracted by finding a word separator (i.e. a space) in text segments or by determining a distance between two neighboring text segments. Under the latter circumstance, if the distance is greater than a predetermined threshold value, the two neighboring text segments are divided into two words. In this patent, the input is a PDF file, and the output is a collection of words included in the PDF file.

U.S. Pat. No. 5,859,648 discloses a font replacement method used for computers. This method is mainly for finding fonts visually similar to fonts prepared to be replaced so as to obtain grids of characters. In this patent, a similar font is found and selected in a font table, and then the entire width of the font is adjusted so that characters having this font cannot be visually changed. The selection of the similar font is based on scores obtained according to similarity based on the aspect of sense of vision without considering similarity based on the aspect of character shape measurement. However, as for extraction of circumscribed rectangles of characters, it is necessary to find similar fonts based on the aspect of character shape measurement, not based on the aspect of sense of vision. Therefore, the font replacement method in this patent does not have effect on extraction of circumscribed rectangles of characters.

SUMMARY OF THE INVENTION

The disadvantages of the prior art are overcome by the present invention. The present invention proposes an apparatus and a method for extracting circumscribed rectangles of one or more characters in a transplantable electronic document by carrying out a font replacement in a case where some kinds of fonts in the transplantable electronic document lack measurement information of character shape. The circumscribed rectangles of the characters are also called the minimum circumscribed rectangles of the characters. The present invention belongs to the field of document processing, and may be applied to document content extraction, document reuse, and document retrieval.

According to one aspect of the present invention, an apparatus for extracting circumscribed rectangles of characters in a transplantable electronic document is provided. The apparatus comprises a command and resource extraction device configured to extract text-segment-related commands and original font resources corresponding to one or more text segments in one or more pages of the transplantable electronic document; a division device configured to divide the original font resources into one or more fonts that need to be replaced, and one or more fonts that do not need to be replaced, in which the fonts that need to be replaced serve as fonts prepared to be replaced; a font replacement device configured to seek fonts most similar to the fonts prepared to be replaced based on the aspect of character shape measurement in an outer replacement font table as candidate fonts for replacing the fonts prepared to be replaced, and then let the candidate fonts and the fonts that do not need to be replaced, make up font resources after font replacement; a measurement information extraction device configured to extract character shape measurement information of the characters in the text segments based on the font resources after font replacement; and a calculation device configured to calculate the circumscribed rectangles of the characters based on the text-segment-related commands and the character shape measurement information of the characters.

According to another aspect of the present invention, a method of extracting circumscribed rectangles of characters in a transplantable electronic document is provided. The method comprises a command and resource extraction step of extracting text-segment-related commands and original font resources corresponding to one or more text segments in one or more pages of the transplantable electronic document; a division step of dividing the original font resources into one or more fonts that do not need to be replaced, and one or more fonts that needs to be replace, in which the fonts that need to be replaced serve as fonts prepared to be replaced; a font replacement step of seeking fonts most similar to the fonts prepared to be replaced based on the aspect of character shape measurement in an outer replacement font table as candidate fonts for replacing the fonts prepared to be replaced, and then letting the candidate fonts and the fonts that do not need to be replaced make up font resources after font replacement; a measurement information extraction step of extracting character shape measurement information of the characters in the text segments based on the font resources after font replacement; and a calculation step of calculating the circumscribed rectangles of the characters based on the text-segment-related commands and the character shape measurement information of the characters.

The present invention can be utilized for extracting the minimum circumscribed rectangles of characters in a transplantable electronic document such as a PDF file, a PS file, etc.; the extracted circumscribed rectangles of the characters can be applied to document extraction, document reuse, document retrieval, etc. For example, by comparing relationships of geometric distributions of the circumscribed rectangles of the characters, it is possible to carry out a match between an electronic document and an image file so as to achieve document retrieval.

BRIEF DESCRIPTION OF THE DRAWINGS

in FIG. 4, on the left side is the effect of extraction of circumscribed rectangles of characters by employing a conventional font replacement method i.e. open-source software "Sumatra PDF", and on the right side is the effect of extraction of circumscribed rectangles of characters by employing an embodiment of the present invention.

DETAILED DESCRIPTION OF THE PREFERRED EMBODIMENTS

Hereinafter, embodiments of the present invention will be concretely described with reference to the drawings.

Figure 1:
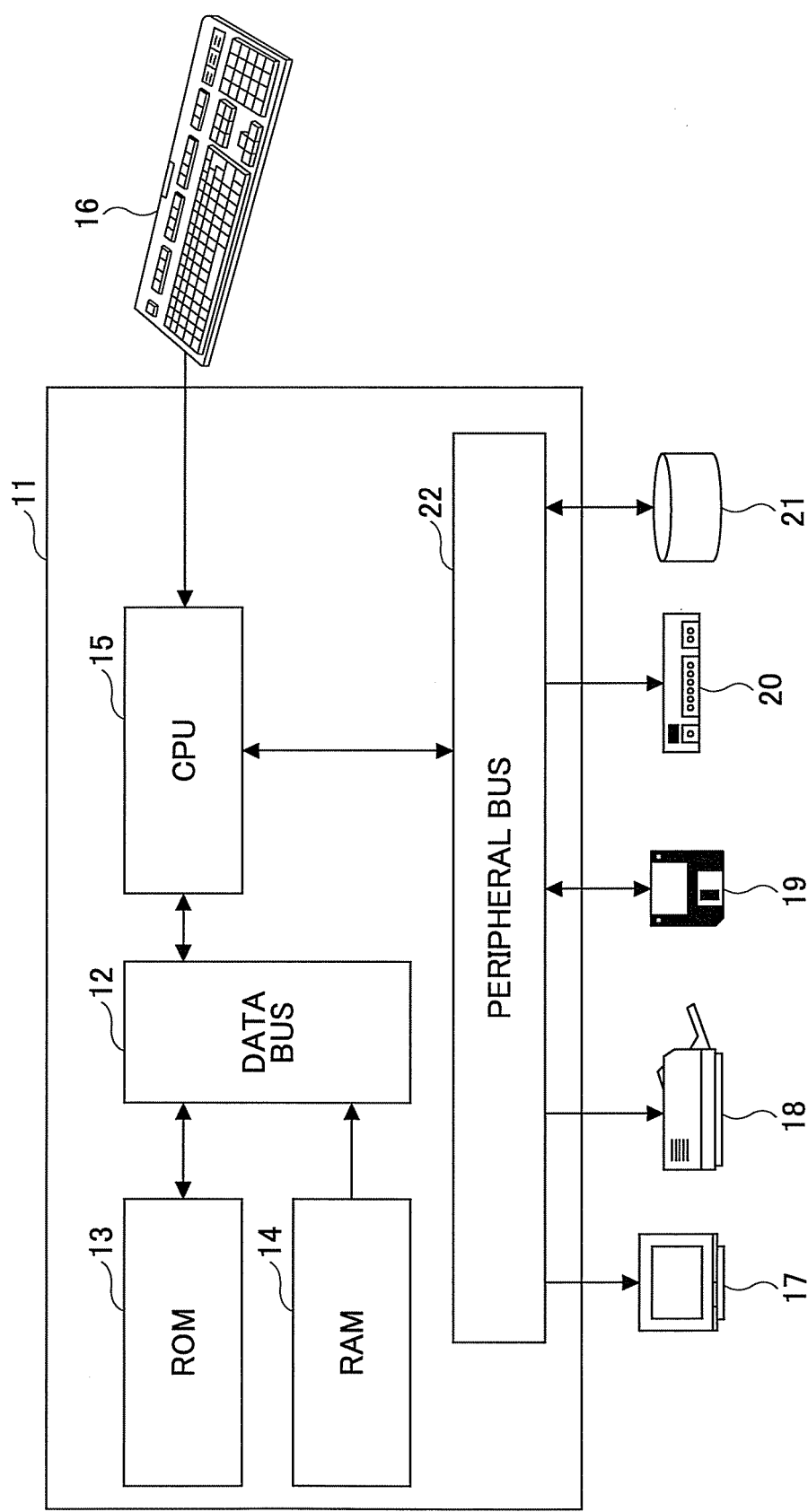
FIG. 1 illustrates a computer system by which circumscribed rectangles of characters in a transplantable electronic document can be extracted, according to an embodiment of the present invention.

As shown in FIG. 1, a computer system 10, by which circumscribed rectangles of characters in a transplantable electronic document can be extracted, according to an embodiment of the present invention comprises a computer 11, a keyboard 16, a display 17, a printer 18, a floppy driver 19, a network access unit 20, and a hard disk driver 21. The computer 11 includes a data bus 12, a read-only memory (ROM) 13, a random access memory (RAM) 14, a central processing unit (CPU) 15, and a peripheral bus 22.

According to instructions from the RAM 14, the CPU 15 controls receipt and processing of input data as well as output of the display 17 or other peripheral units. In this embodiment, a function of the CPU 15 is processing an input PDF file so as to extract circumscribed rectangles of characters included in the input PDF file. The extracted circumscribed rectangles of the characters may be utilized by other application programs in the CPU 15.

The CPU 15 accesses the ROM 13 and the RAM 14 via the data bus 12. The RAM 14 is used as a readable and writable memory by the CPU 15, and serves as a working area and a mutable data storage area for various processes. The ROM 13 stores a transplantable electronic document such as a PDF file, a program for extracting circumscribed rectangles of characters, and other programs for employing the extracted circumscribed rectangles of the characters.

The peripheral bus 22 is used for accessing peripheral units, which are connected to the computer 11, such as input units, output units, and storage units, etc. In this embodiment, the peripheral units include the display 17, the printer 18, the floppy disk driver 19, the network access unit 20, and the hard disk driver 21. The display 17 displays data or one or more images output by the CPU 15 via the peripheral bus 22. The display 17 may be a grid display unit such as CRT or LCD display, etc. The printer 18 prints the data or the images output by the CPU 15 on paper sheets or the like. In order to display or output a PDF file on an output unit such as the display 15 or the printer 18, etc., the computer system 10 needs to carry out grid processing of a document so as to achieve a conversion from the PDF file to its corresponding image. In another embodiment, a CPU or the like may also be included in an output unit such as the printer 18 so as to achieve the similar conversion from the PDF file to the image. The floppy disk driver 19 and the hard disk driver 21 are used for driving a floppy disk and a hard disk storing one or more PDF files, respectively. By using the floppy disk, the PDF files can be physically passed among various computer systems. The hard disk has a bigger storage space, and can be accessed more rapidly. Other storage units such as USB flash memories may also be used for storing PDF files which are accessed by the computer system 10. The computer system 10 may send data to and receive data from other computer systems via the network access unit 20. A user may input instructions to the computer system 10 via the keyboard 16.

Figure 2:
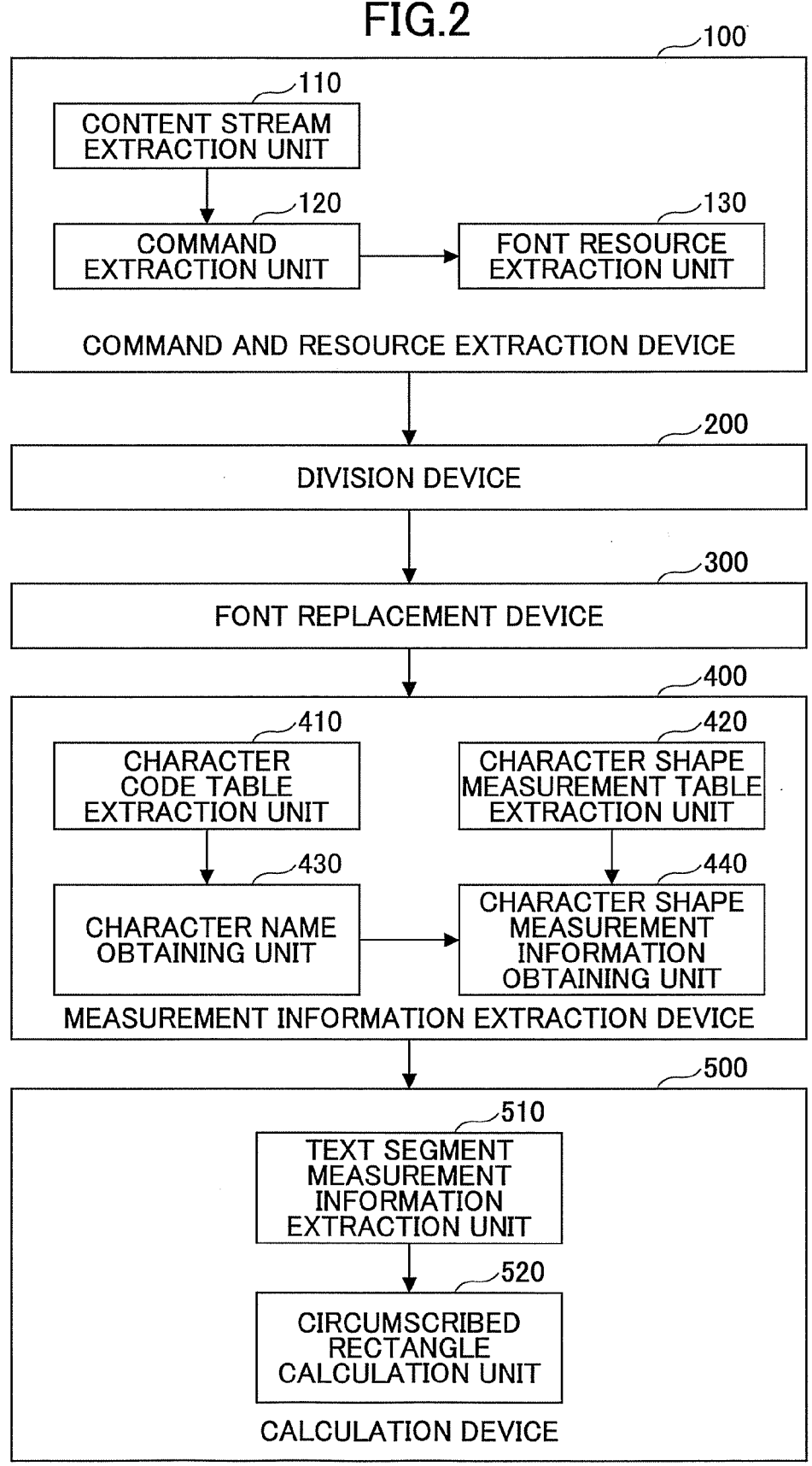
FIG. 2 illustrates an overall block diagram of an apparatus by which circumscribed rectangles of characters in a transplantable electronic document can be extracted, according to an embodiment of the present invention.

FIG. 2 illustrates an overall block diagram of an apparatus by which circumscribed rectangles of characters in a transplantable electronic document are extracted, according to an embodiment of the present invention. The apparatus for extracting the circumscribed rectangles of the characters in the transplantable electronic document comprises a command and resource extraction device 100 configured to extract text-segment-related commands and original font resources corresponding to one or more text segments in one or more pages of the transplantable electronic document; a division device 200 configured to divide the original resource into one or more fonts that do not need to be replaced, and one or more fonts that need to be replaced, in which the fonts that need to be replaced serves as fonts prepared to be replaced; a font replacement device 300 configured to seek fonts most similar to the fonts prepared to be replaced based on the aspect of character shape measurement in an outer replacement font table as candidate fonts for replacing the fonts prepared to be replaced, and then let the candidate fonts and the fonts that do not need to be replaced make up font resources after font replacement; a measurement information extraction device 400 configured to extract character shape measurement information of the characters in the text segments based on the font resources after font replacement; and a calculation device 500 configured to calculate the circumscribed rectangles of the characters based on the text-segment-related commands and the character shape measurement information of the characters.

The transplantable electronic file may be a PDF file or one having another format such as PS (PostScript).

Two kinds of character shape measurement information are necessary when extracting circumscribed rectangles of characters; they are a character code table and a character shape measurement table. The character code table reflects a correspondence relationship between character codes and character names; for example, as for character code 65, its corresponding character name may be "A". Various kinds of font encoding methods are used in a PDF file; therefore it is necessary to determine the encoding method corresponding to each font. The character shape measurement table reflects a correspondence relationship between character names and character shape measurement information.

Figures 3, 4:
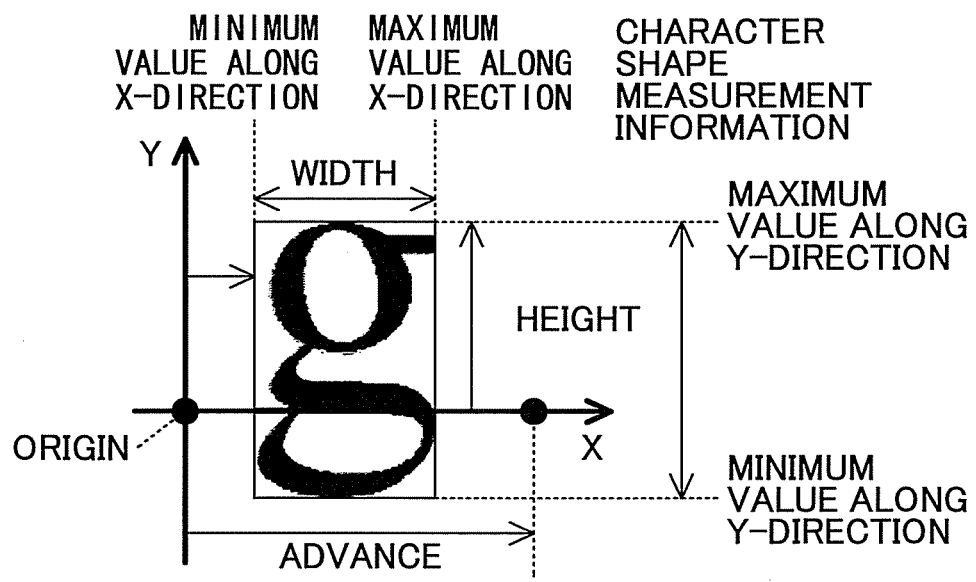
FIG. 3 illustrates character shape measurement information of character "g".
FIG. 4 illustrates comparison of effects of extractions of circumscribed rectangles of characters.

FIG. 3 illustrates character shape measurement information of character "g". As shown in FIG. 3, the character shape measurement information includes width, height, the maximum and minimum values along the X-direction, the maximum and minimum values along the Y-direction, origin (the start position), etc. The division device 200, the font replacement device 300, and the measurement information extraction device 400 analyze font resources, and then extract the above-mentioned two kinds of measurement information, i.e.

the character code table and the character shape measurement table. Most of fonts include the above-mentioned two kinds of measurement information. However, some fonts only include parts of font attributes, such as font name (for example, "Song", "Times New Roman", etc.), font style (for example, "Italic", "Bold", etc.), etc.; that is, these fonts lack the necessary data such as the character shape measurement information, for extracting circumscribed rectangles of characters. As a result, it is necessary to make a font replacement to replace these fonts so as to guarantee that the two fonts before and after the font replacement have similarity based on the aspect of geometric measurement of character shape. The calculation device 500 calculates circumscribed rectangles of characters based on character shape measurement information and text segment measurement information.

The command and resource extraction device 100 comprises a content stream extraction unit 110 configured to extract one or more content streams in a transplantable electronic document, and then decode the content streams; a command extraction unit 120 configured to extract one or more text-segment-related commands in the decoded content streams; and a font resource extraction unit 130 configured to extract font resources, which correspond to the text-segment-related commands, in one or more page resources of the transplantable electronic document.

The content stream extraction unit 110 analyzes the structure of the transplantable electronic document, for example, the structure of a PDF file, and then obtains a tree structure of the PDF file. The tree structure is convenient for accessing the content streams and the respective page resources of the PDF file; at the same time, encoding methods of the content streams can be acquired too. Then the content steam extraction unit 110 decodes the content streams based on the encoding methods of the contents streams. According to the PDF specification, a PDF file supports various encoding methods of content streams, for example, "FlateDecode", "LZWDecode", etc. PDF content streams are composed of PDF commands and parameters corresponding to the PDF commands; each PDF command and its corresponding parameters control a page drawing operation. The command extraction unit 120 analyzes commands in the decoded PDF content streams, and then extracts text-segment-related commands corresponding to text segments. The extracted text-segment-related commands may be stored in a text-segment-related command table. By using the text-segment-related commands, font resources adopted by the corresponding text segments can be obtained. The font resource extraction unit 130, based on the text-segment-related commands, extracts the font resources adopted by the corresponding text segments, and then stores the extracted font resources of the current page in a font resource table.

The division device 200 lets one or more fonts, which lack measurement information of character shape, in the font resources be fonts prepared to be replaced. The font replacement device 300 seeks fonts most similar to the fonts prepared to be replaced based on the aspect of character shape measurement in an outer replacement font table as candidate fonts for replacing the fonts prepared to be replaced, and then lets the candidate fonts and fonts that do not need to be replaced make up font resources after font replacement. The measurement information extraction device 400 includes a character code table extraction unit 410 configured to extract one or more character code tables of the fonts from the font resources after font replacement; a character shape measurement table extraction unit 420 configured to extract one or more character shape measurement tables of the fonts from the font files after font replacement; a character name obtaining unit 430 configured to obtain character names, which correspond to the character codes, in the character code tables based on the character codes; and a character measurement information obtaining unit 440 configured to obtain character measurement information, which corresponds to the obtained character names, in the character shape measurement tables based on the obtained character names.

The division device 200, the font replacement device 300, and the measurement information extraction device 400 are used for extracting the font code table and the character shape measurement table of the font resources. The division device 200 determines whether the font resources can be used, and seeks the similar fonts for replacing the fonts that do not have enough font data. If the font resources do not have enough information, for example, lacking the character shape measurement information, it is necessary that the font replacement device 300 calls a font replacement algorithm to find the similar fonts. And the font replacement device 300 calls an outer replacement font table which can be utilized for replacing fonts; fonts, for example, those owned by the operating system itself, in this replacement font table are loaded from outside. The font replacement device 300 employs some attributes, which always belong to the PDF font resources, to calculate similarity between the two fonts so as to make a font replacement.

Since the font replacement in the embodiments of the present invention is used for extracting circumscribed rectangles of characters, it is possible to utilize font attributes such as "XHeight", "Ascend", "Descend", "CapHeight", "Leading", "StemV", and "StemH" to calculate the similarity; a matching approach can be employed when calculating the similarity.

The PDF specification gives explanation about the meaning of the respective font attributes. The font attributes prescribed in the PDF 1.7 specification are as follows.

"XHeight" refers to the maximum basic height of all of the characters having the same font, i.e. the maximum distance between the base lines and the main lines of all of the characters.

"Ascend" refers to the maximum height of the parts in all the characters having the same font, upwardly exceeding the main strokes, i.e. the maximum distance of the parts higher than "XHeight".

"Descend" refers to the maximum height of the parts in all the characters having the same font, downwardly exceeding the base line, i.e. the maximum distance of the parts lower than the base line.

"CapHeight" refers to the maximum height of the parts in the all capital characters having the same font, exceeding the base line.

"Leading" refers to a distance between the base lines of consecutive text lines.

"StemV" refers to the width of the main vertical stems in all the characters having the same font.

"StemH" refers to the width of the main horizontal stems in all the characters having the same font.

The above-mentioned font attributes can stand for geometric information of the characters, and may be used for embodying the character shape measurement. The font replacement device 300 employs the following equation (1) to calculate a distance dis between a font prepared to be selected and a font prepared to be replaced. The smaller the distance dis is, the higher the similarity between the two is.

$$dis(X, Y) = \sum_{i=1}^{n} w_i |x_i - y_i| \quad (1)$$

Here $X=(x_1, x_2, \ldots, x_n)$ is a font attribute vector of the font prepared to be selected, and $x_i$ refers to the ith font attribute value; $Y=(y_1, y_2, \ldots, y_n)$ is a font attribute vector of the font prepared to be replaced, and $y_i$ refers to the ith font attribute value; $w_i$ refers to weight of the ith font attribute value, and stands for the importance of this font attribute; n refers to the number of adopted font attributes, and may be 7 in the embodiment of the present invention. Of course it is possible to choose a portion of the adopted font attributes; that is, n may be a positive integer smaller than 7. The font attribute values can be extracted from PDF font resources, and definitions of meanings of the values are in the promulgated PDF specification.

Then the font replacement device 300 chooses a font most similar to the font prepared to be replaced (i.e. a font whose distance dis is minimum) as a candidate font. FIG. 4 illustrates comparison of effects of extractions of circumscribed rectangles of characters. The effects of extractions of circumscribed rectangles of characters obtained by using various font replacement methods to replace Times New Roman font, are shown in FIG. 4 where on the left side is the effect of extraction of circumscribed rectangles of characters by using a conventional font replacement method, i.e. open-source software "Sumatra PDF", and on the right side is the effect of extraction of circumscribed rectangles of characters by using the embodiment of the present invention. According to FIG. 4, it is obvious that more accurate extraction results of circumscribed rectangles of characters can be acquired by using the embodiment of the present invention.

In the PDF specification, each font has a built-in encoding means, i.e. a character code table. The build-in encoding means may be set by an "Encoding" option in PDF font resources. The value of the "Encoding" option may be the name of the encoding means such as "Mac-RomanEncoding", "MacExpertEncoding", "StandardEncoding", or "Win-AnsiEncoding". And the "Encoding" option may also be a dictionary option. In a case where the "Encoding" option is the dictionary option, a sub-option "/Difference" in this "Encoding" option includes a correspondence relationship between character codes and character names, and the character code table is built according to this kind of correspondence relationship.

The character code table extraction device 410 analyzes the font resources, and then determines whether the "Encoding" option exists in the font resources. If the "Encoding" option does not exist, a character code table corresponding to the name of the encoding means, i.e. "StandardEncoding", is extracted. If the "Encoding" option exists, the "Encoding" option is checked. In this case, if the value of the "Encoding" option is the name of the encoding means, the character code table extraction device 410 extracts a character code table corresponding to the name of the encoding means; if the "Encoding" option is the dictionary option, the character code table extraction device 410 analyzes contents of the dictionary, and builds a character code table by employing character names and their corresponding character codes, and then extracts this character code table.

The character shape measurement table extraction device 420 extracts a character shape measurement table of a font; the entry of the character shape measurement table is a pair of key and value in which the key refers to character name, and the value refers to character shape measurement information corresponding to the character name. After fonts are replaced, the obtained fonts (candidate fonts and fonts that do not need to be replaced) include font files used for acquiring grids of characters, or include Adobe Font Metrics (AFM) font files which include character shape measurement information of fonts. If a font includes an AFM file, the character shape measurement table extraction device 420 utilizes an existing AFM file analyzer to analyze and obtain the character shape measurement information of this font. Otherwise, i.e., if the font does not include an AFM file, the character shape measurement table extraction device 420 utilizes an existing engine for obtaining grids of characters to obtain the grids of the characters, and converts vector diagrams of the characters into grid images; by this way, the character shape measurement table extraction device 420 can easily extract the character shape measurement information from the grid images. As for obtaining grids of characters, an open-source engine for obtaining grids of characters, for example, the font engine "FreeType2" whose website is http://www.freetype.org/, can be employed.

Then the character name obtaining unit 430, according to character codes, obtains character names corresponding to the character codes in the character code tables. The character shape measurement information obtaining unit 440, according to the obtained character names, obtains character shape measurement information corresponding to the character names in the character code tables.

The calculation device 500 comprises a text segment measurement information extraction unit 510 configured to extract text segment measurement information of text segments in a transplantable electronic document; and a circumscribed rectangle calculation unit 520 configured to calculate circumscribed rectangles of characters according to the text segment measurement information and the character shape measurement information of characters.

The PDF specification includes various types of text-segment-related commands. The text segment measurement information extraction device 510 extracts text segment measurement information such as positions of text segments, horizontal zoom parameters, vertical zoom parameters, rotation degrees, font sizes, etc., from the text-segment-related commands. The text segment includes one or more characters that may be full-width characters such as the Chinese characters, or may be half-with characters such as the English alphabetical characters; the text segment does not necessarily refer to a word, or does not necessarily refer to a paragraph.

According to the PDF 1.7 specification, the text segment measurement information can be extracted from the text-segment-related commands. For example, the start position (200, 300) of a text segment, can be extracted from a start position command "200 300 Td" of the text segment; the horizontal zoom parameter, the vertical zoom parameter, and the rotation degree can be obtained by analyzing a text segment matrix. In the latter situation, for example, (100, 0, 0, 100, 0) can be determined as a text segment matrix according to a command "100 0 0 100 0 0 Tm"; therefore it can be acquired from the text segment matrix that the horizontal zoom parameter is 100, the vertical zoom parameter is 100, and the rotation degree is 0. Again, for example, the font size can be extracted from a command "/TT1 12 Tf"; here the font size is 12.

The circumscribed rectangle calculation device 520 calculates circumscribed rectangles of characters by using the text segment measurement information and the character shape measurement information. A vector (x,y,w,h,θ) is used for describing the circumscribed rectangle of a character; here x refers to the horizontal coordinate of the top left corner of the character, y refers to the vertical coordinate of the top left corner of the character, w refers to the width of the character, h refers to the height of the character, and θ refers to the rotation degree of the character. The text segment measurement information extraction device 510 can extract, from the text-segment-related commands, the coordinates of the start position (here the start position is the top left corner) and the rotation degree of the character; for example, it can be obtained from a command "200 300 Td" that the start position of a character in a text segment is (200, 300). The width and the height of the character can be calculated according to the following equation (2).

$$w = gw * hscale * fs$$

$$h = gh * vscale * fs \qquad (2)$$

Here gw refers to the width of the character shape of the character, gh refers to the height of the character shape of the character, hscale refers to the horizontal zoom parameter, vscale refers to the vertical zoom parameter, and fs refers to the font size; all of them are extracted from the text-segment-related commands by the text segment measurement information extraction device 510.

The start position of each character in a text segment may also be calculated based on the start position of the text segment by using a recurrence algorithm; here the vertical coordinate of each character in the same text segment is constant. It is supposed that (x',y') is the start position of a known preceding character; (x,y) is the start position of a current character; w is an extension width of the current character, which is different from the width of the circumscribed rectangle of the character, and is somewhat greater than the width of the circumscribed rectangle of the character; and w' corresponds to an advance width advance (labeled as "ADVANCE" in FIG. 3) of the character shape of the character, which belongs to the character shape measurement information, and can be acquired by the character shape measurement information obtaining device 440 (in other words, the value after converting advance from the character shape measurement space into the text measurement space is w'). The following equation (3) is a corresponding recurrence formula of coordinates.

$$x = x' + w'$$

$$y = y'$$

$$w' = advance * hscale * fs \qquad (3)$$

Therefore the circumscribed rectangles of all of the characters in the text segments can be acquired by carrying out the above-mentioned calculation.

The present invention also provides a method of extracting circumscribed rectangles of one or more characters in a transplantable electronic document. The method comprises a command and resource extraction step, which can be executed by the command and resource extraction device 100, of extracting one or more text-segment-related commands and one or more original font resources corresponding to one or more text segments in one or more pages of the transplantable document; a division step, which can be executed by the division device 200, of dividing the original font resources into one or more fonts that does not need to be replaced, and one or more fonts that needs to be replaced, in which the fonts that need to be replaced serve as the fonts prepared to be replaced; a font replacement step, which can be executed by the font replacement device 300, of seeking fonts most similar to the fonts prepared to be replaced based on the aspect of character shape measurement in an outer replacement font table as candidate fonts for replacing the fonts prepared to be replaced, and letting the candidate fonts and the fonts that does not need to be replaced make up font resources after font replacement; a measurement information extraction step, which can be executed by the measurement information device 400, of extracting character shape measurement information of the characters in the text segments based on the font resources after font replacement; and a calculation step, which can be executed by the calculation device 500, of calculating, based on the text segment related commands and the character shape measurement information of the characters, the circumscribed rectangles of the characters.

The command and resource extraction step comprises a content stream extraction step, which can be executed by the content stream extraction unit 110, of extracting one or more content streams from the transplantable electronic document, and then decoding the content streams; a command extraction step, which can be executed by the command extraction unit 120, of extracting the text-segment-related commands from the decoded content streams; and a font resource extraction step, which can be executed by the font resource extraction device 130, of extracting the font resources corresponding to the text-segment-related commands from page resources in the transplantable electronic document.

The division step lets one or more fonts in the font resources lacking character shape measurement information serve as the fonts prepared to be replaced.

The font replacement step utilizes a matching approach to calculate similarities based on the aspect of character shape measurement, between the fonts in the outer replacement font table prepared to be selected and the fonts prepared to be replaced, and lets the fonts prepared to be selected having the highest similarities serve as the candidate fonts.

The measurement information step comprises a character code table extraction step, which can be executed by the character code table extraction unit 410, of extracting one or more character code tables from the font resources after font replacement; a character shape measurement table extraction step, which can be executed by the character shape measurement table extraction unit 420, of extracting one or more character shape measurement tables from the font files after font replacement; a character name obtaining step, which can be executed by the character name obtaining unit 430, of obtaining, from the character code tables, character names corresponding to the character codes; a character shape measurement information obtaining step, which can be executed by the character shape measurement information obtaining unit 440, of obtaining, from the character shape measurement tables, character shape measurement information corresponding to the obtained character names.

The calculation step comprise a text segment measurement information extraction step, which can be executed by the text segment measurement information extraction unit 510, of extracting text segment measurement information from the text-segment-related commands in the transplantable electronic document; and a circumscribed rectangle calculation step, which can be executed by the circumscribed rectangle calculation unit 520, of calculating the circumscribed rectangles of the characters.

A PDF file is selected as an example for purpose of illustration in this specification, but those people practiced in the art can understand that the embodiments of the present invention may also be applied to a transplantable electronic document having, for example, a PS format.

A series of operations described in this specification can be executed by hardware, software, or a combination of hardware and software. When the operations are executed by software, a computer program can be installed in a dedicated built-in storage device of a computer so that the computer can execute the computer program. Alternatively, the computer program can be installed in a common computer by which various types of processes can be executed so that the common computer can execute the computer program.

For example, the computer program may be stored in a recording medium such as a hard disk or a ROM in advance. Alternatively, the computer program may be temporarily or permanently stored (or recorded) in a movable recording medium such as a floppy disk, a CD-ROM, a MO disk, a DVD, a magic disk, or a semiconductor storage device.

While the present invention is described with reference to specific embodiments chosen for purpose of illustration, it should be apparent that the invention is not limited to these embodiments, but numerous modifications could be made thereto by those people skilled in the art without departing from the basic concept and scope of the invention.

The present application is based on Chinese Priority Patent Application No. 200910249849.1 filed on Nov. 27, 2009, the entire contents of which are hereby incorporated by reference.

What is claimed is:

1. An apparatus for extracting circumscribed rectangles of one or more characters in a transplantable electronic document, comprising:
a command and resource extraction device configured to extract one or more text-segment-related commands and one or more original font resources corresponding to text segments in one or more pages of the transplantable electronic document;
a division device configured to divide the original font resources into one or more fonts that need to be replaced, and one or more fonts that do not need to be replaced, in which the fonts that need to be replaced serve as fonts prepared to be replaced;
a font replacement device configured to seek fonts most similar to the fonts prepared to be replaced based on the aspect of character shape measurement in an outer replacement font table as candidate fonts for replacing the fonts prepared to be replaced, and then let the candidate fonts and the fonts that do not need to be replaced make up font resources after font replacement;
a measurement information extraction device configured to extract character shape measurement information of the characters in the text segments based on the font resources after font replacement; and
a calculation device configured to calculate the circumscribed rectangles of the characters based on the text-segment-related commands and the character shape measurement information of the characters,
wherein the font replacement device utilizes a matching approach to determine similarities between fonts in the outer replacement font table, prepared to be selected and the fonts prepared to be replaced based on the aspect of character shape measurement, and then lets the fonts prepared to be selected having highest similarities serve as the candidate fonts, wherein
the font replacement device determines a similarity between a font prepared to be selected and a font prepared to be replaced based on a distance dis, calculated in equation (1) as follows, between the font prepared to be selected and the font prepared to be replaced:

$$dis(X, Y) = \sum_{i=1}^{n} w_i |x_i - y_i|, \quad (1)$$

wherein $X=(x_1, x_2, \ldots, x_n)$ is a font attribute vector of the font prepared to be selected, $x_i$ refers to value of ith font attribute of the font prepared to be selected, $Y=(y_1, y_2, \ldots, y_n)$ is a font attribute vector of the font prepared to be replaced, $y_i$ ers to value of ith font attribute of the font prepared to be replaced, $w_i$ refers to a weight of the ith font attribute, n refers to a total number of adopted font attributes, and
wherein a smaller distance dis between the font prepared to be selected and the font prepared to be replaced corresponds to a higher similarity between the font prepared to be selected and the font prepared to be replaced.

2. The apparatus according to claim 1, wherein, the command and resource extraction device comprises:
a content stream extraction unit configured to extract one or more content streams in the transplantable electronic documents, and then decode the content streams;
a command extraction unit configured to extract the text-segment-related commands in the decoded content streams; and
a font resource extraction unit configured to extract the original font resources corresponding to the text-segment-related commands from page resources of the transplantable electronic document.

3. The apparatus according to claim 1, wherein:
the division device lets fonts in the original font resource, lacking character shape measurement information, serve as the fonts prepared to be replaced.

4. The apparatus according to claim 1, wherein the measurement information extraction device comprises:
a character code table extraction unit configured to extract character code tables of the fonts from the font resource after font replacement;
a character shape measurement table extraction unit configured to extract character shape measurement tables of the fonts from font files after font replacement;
a character name obtaining unit configured to obtain character names corresponding to character codes from the character code tables based on the character codes; and
a character measurement information obtaining unit configured to obtain character shape measurement information corresponding to the obtained character names from the character shape measurement tables based on the character names.

5. The apparatus according to claim 1, wherein, the calculation device comprises:
a text segment measurement information extraction unit configured to extract text segment measurement information from the text-segment-related commands of the transplantable electronic document; and
a circumscribed rectangle calculation unit configured to calculate the circumscribed rectangles of the characters according to the text segment measurement information and the character shape measurement information of the characters.

6. The apparatus according to claim 1, wherein:
the transplantable electronic document is a PDF file.

7. A method of extracting circumscribed rectangles of one or more characters in a transplantable electronic document, comprising:

- a command and resource extraction step of extracting one or more text-segment-related commands and one or more original font resources corresponding to text segments in one or more pages of the transplantable electronic document;
- a division step of dividing the original font resources into one or more fonts that need to be replaced, and one or more fonts that do not need to be replaced, in which the fonts that need to be replaced serve as fonts prepared to be replaced;
- a font replacement step of seeking fonts most similar to the fonts prepared to be replaced based on the aspect of character shape measurement in an outer replacement font table as candidate fonts for replacing the fonts prepared to be replaced, and then letting the candidate fonts and the fonts that do not need to be replaced make up font resources after font replacement;
- a measurement information extraction step of extracting character shape measurement information of the characters in the text segments based on the font resources after font replacement; and
- a calculation step of calculating the circumscribed rectangles of the characters based on the text-segment-related commands and the character shape measurement information of the characters, wherein a matching approach is utilized in the font replacement step to determine similarities between fonts in the outer replacement font table, prepared to be selected and the fonts prepared to be replaced based on the aspect of character shape measurement, and then lets the fonts prepared to be selected having highest similarities serve as the candidate fonts, wherein a similarity between a font prepared to be selected and a font prepared to be replaced is determined in the font replacement step based on a distance dis, calculated in equation (1) as follows, between the font prepared to be selected and the font prepared to be replaced:

$$dis(X, Y) = \sum_{i=1}^{n} w_i |x_i - y_i|, \qquad (1)$$

wherein $X=(x_1, x_2, \ldots, x_n)$ is a font attribute vector of the font prepared to be selected, $x_i$ refers to value of ith font attribute of the font prepared to be selected, $Y=(y_1, y_2, \ldots, y_n)$ is a font attribute vector of the font prepared to be replaced, $y_i$ refers to value of ith font attribute of the font prepared to be replaced, $w_i$ refers to a weight of the ith font attribute, n refers to a total number of adopted font attributes, and whereto a smaller distance dis between the font prepared to be selected and the font prepared to be replaced corresponds to a higher similarity between the font prepared to be selected and the font prepared to be replaced.

* * * * *